United States Patent [19]
Huang

[11] Patent Number: 5,343,376
[45] Date of Patent: Aug. 30, 1994

[54] STRUCTURE OF LASER POINTER

[76] Inventor: Chao C. Huang, 10F, No. 185, Yung Chi Rd., Taipei, Taiwan

[21] Appl. No.: 29,482

[22] Filed: Mar. 11, 1993

[51] Int. Cl.$^5$ .............................................. F21K 7/00
[52] U.S. Cl. ................................. 362/259; 362/187; 362/206
[58] Field of Search ............... 362/259, 118, 187, 205, 362/206, 202

[56] References Cited

U.S. PATENT DOCUMENTS

| | | | |
|---|---|---|---|
| 4,517,628 | 5/1985 | McDermott | 362/187 |
| 4,563,728 | 1/1986 | Bruggeman et al. | 362/118 |
| 4,916,579 | 4/1990 | Simms | 362/259 |
| 5,056,097 | 10/1991 | Meyers | 362/259 |
| 5,193,897 | 3/1993 | Halsey | 362/118 |

Primary Examiner—Ira S. Lazarus
Assistant Examiner—Alan B. Cariaso
Attorney, Agent, or Firm—Lowe, Price, LeBlanc & Becker

[57] ABSTRACT

A laser pointer is disclosed including a laser module fitted into a conductive cylindrical casing and attached with a laser firing lens assembly and connected to a battery set and controlled by a switch to fire a laser beam for pointing, the laser module including a focus adjusting element threaded into the inner thread on the cylindrical shell thereof, whereby rotating the focus adjusting element on the cylindrical shell in either direction causes change of distance between the lens of the laser firing lens assembly and the laser diode of the laser module so that the focus is adjusted. The switch has a switching control press rod for switch control, and for fastening to the pocket as the laser pointer is not in use.

3 Claims, 6 Drawing Sheets

STRUCTURE OF LASER POINTER

BACKGROUND OF THE INVENTION

The present invention relates to pointers and relates more particularly to a pen-like laser pointer used for pointing to things on a map, chart, blackboard, etc., by means of the laser beam generated thereby.

A variety of laser pointers have been know, and have appeared on the market. FIG. 6 illustrates a laser module and laser firing lens assembly for a laser pointer according to the prior art. The laser firing lens assembly comprises a lens holder to hold a laser firing lens. The laser module comprises a laser diode controlled to produce a laser beam. The lens holder has an outer thread on one end threaded into an inner thread on the laser module. The focus is adjusted by turning the lens holder on the laser module in either direction. Because the lens holder and the laser module are separately made and then fastened together, the concentricity is difficult to obtain accurately.

SUMMARY OF THE INVENTION

One object of the present invention is to provide a focus control device for the laser pointer which can be conveniently controlled to correct the focus accurately. Another object of the present invention is to provide a control circuit for the laser pointer which stabilizes the output. Still another object of the present invention is to provide a laser pointer which is inexpensive to manufacture and easy to assemble.

The present invention uses a focus control element to adjust the focus by rotating the focus control element on a cylindrical shell to change the distance between the lens and the laser diode without moving the lens. A constant current control circuit is provided to stabilize the output. A clip is integrally made on the cap of the switch for switching control, and for fastening to the pocket as the laser pointer is not in use.

DETAILED DESCRIPTION OF THE PREFERRED EMBODIMENT

Figure 1:
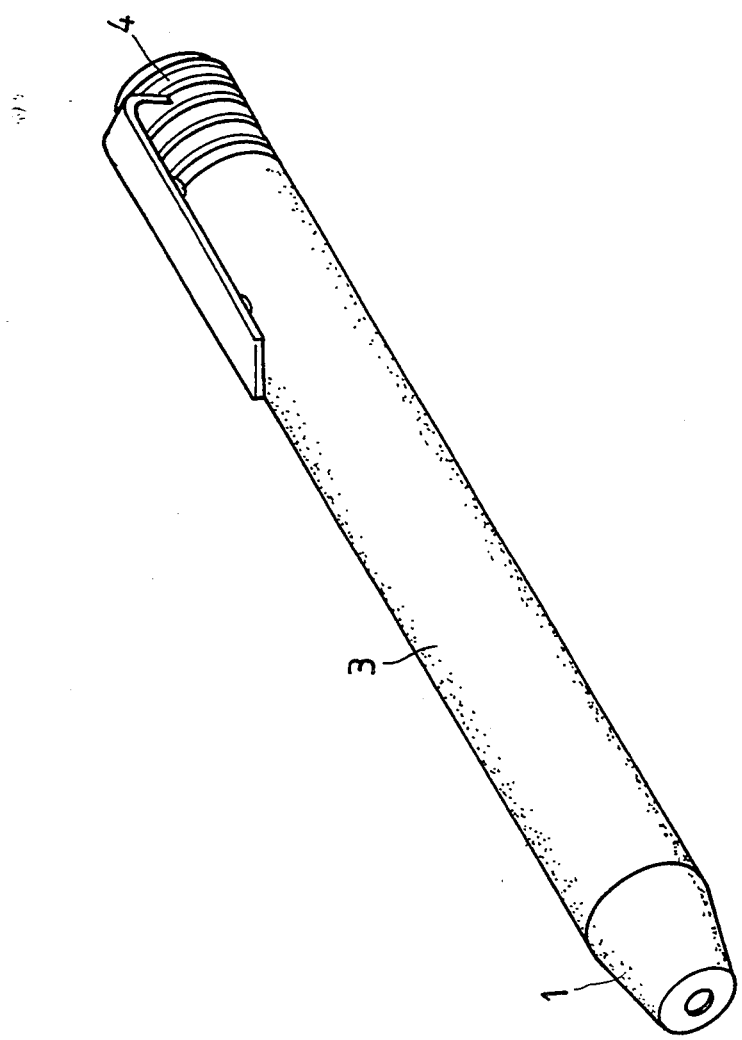
FIG. 1 is a perspective view of a laser pointer constructed according to the present invention.
Figure 2:
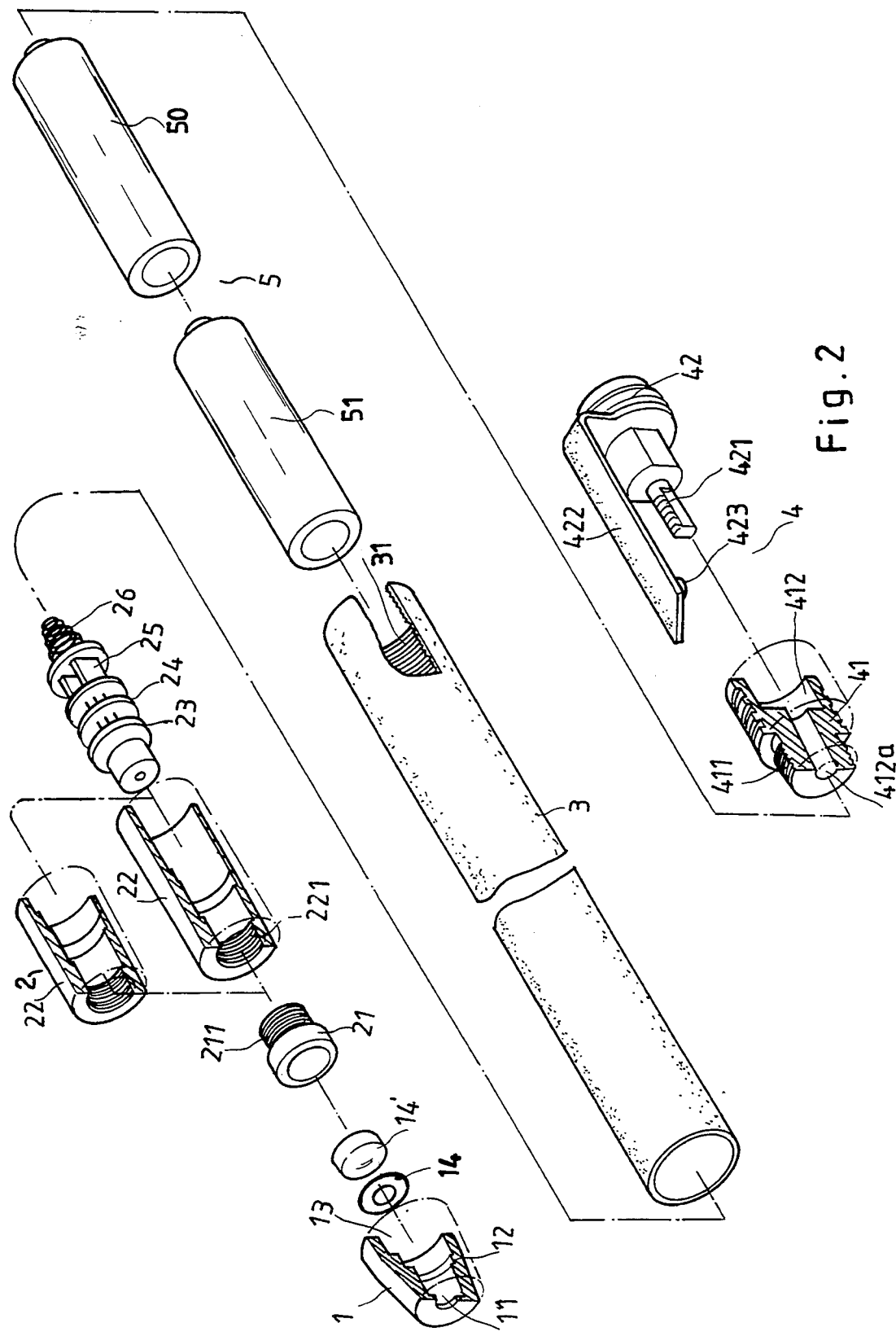
FIG. 2 is a perspective exploded view thereof.

Referring to FIGS. 1 and 2, a laser pointer constructed in accordance with the present invention is generally comprised of a laser firing lens assembly 1, a laser module 2, a cylindrical casing 3, a control switch 4, and a battery set 5.

The laser firing lens assembly 1 is made in the shape of a hollow, truncated cone having a laser firing hole 11 on the front end thereof, and a stepped inside wall 12;13 to hold an O-ring 14, a lens 14', and the focus control element 21 of the laser module 2. The lens 14' is stopped by the focus control element 21 against the O-ring 14 to seal the laser firing hole 11.

The laser module 2 comprises a focus control element 21, which is made in the shape of a hollow screw, a casing 22, a laser diode 23, a rubber cushion 24, a printed circuit board 25, and a spring 26. The casing 22 has an inner thread 221 at one end, into which the screw body 211 of the focus control element 21 is threaded. The focus control element 21 has a small hole 212 (see FIGS. 3 and 4) on the screw body 211 for passing the laser beam. By turning the focus control element 21 on the casing 22, the distance between the laser diode 23 and the lens 14 is adjusted, and therefore the focus is adjusted. The printed circuit board 25, see FIG. 5, has the negative pole connected to the spring 26. The laser diode 23 is connected to the printed circuit board 25 and received inside the casing 22, with the rubber cushion 24 disposed between the laser diode 23 and the printed circuit board 25 for protection.

The cylindrical casing 3 is made from a suitable metal to hold the battery set 5, having an inner thread 31 at the rear end thereof for mounting the switch 4. The battery set 5 is comprised of two dry battery cells 50;51 connected in series, with the positive pole connected to the switch 4 and the negative pole connected to the spring 26.

The switch 4 comprises an insulative stepped socket 41, and a cap 42. The insulative stepped socket 41 has an outer thread 411 around the periphery of front end threaded into the inner thread 31 on the casing 3, a stepped axle hole 412 through the longitudinal center terminated to a small taper orifice 412a, into which the positive pole of the battery set 5 fits. The cap 42 has a conductive plug rod 421 fitted into the stepped axle hole 412 and releasably connected to the positive pole of the battery set 5, and a clip-like press rod 422 for switching control. The clip-like press rod 422 can be used as a clip to fasten the laser pointer to the pocket when the laser pointer is not in use. The clip-like press rod 422 has a raised contact 423 on the inside near the end reversibly pressed to contact the casing 3 in closing the circuit.

Figure 3:
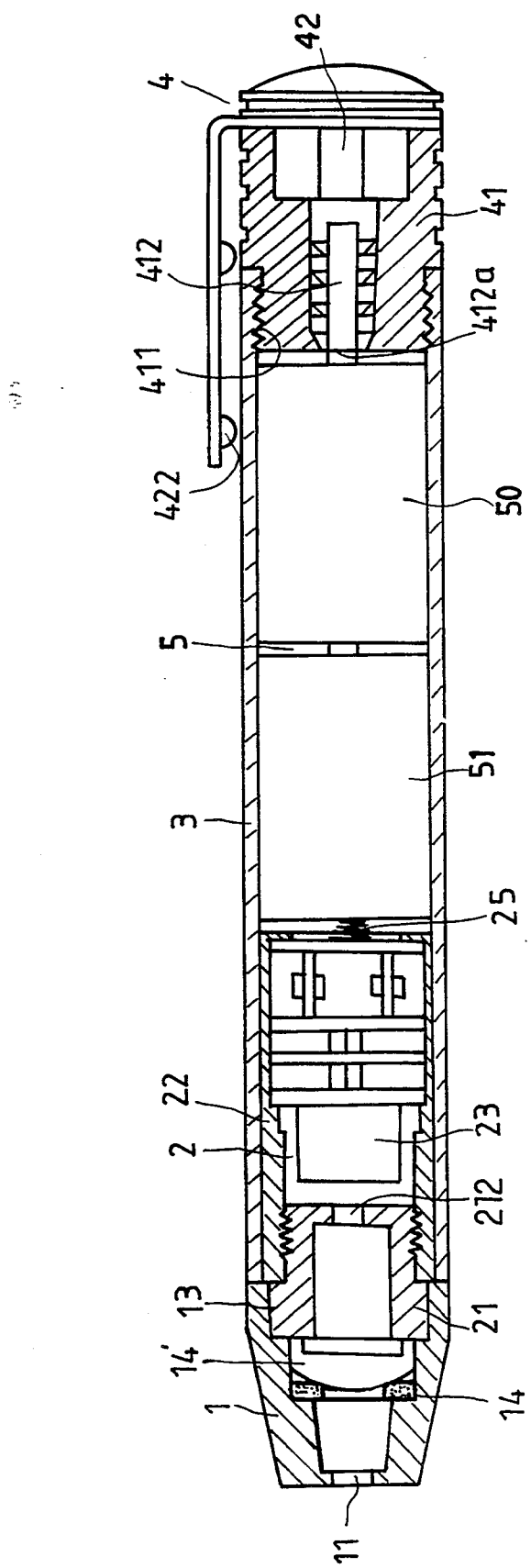
FIG. 3 is a sectional view thereof in the longitudinal direction.

Referring to FIG. 3, the laser module 2 is fitted into the cylindrical casing 3 and stops against the laser firing lens assembly 1 with the focus control element 21 fitted into the stepped inside wall 13 and stopped against the lens 14, then the battery set 5 is inserted into the cylindrical casing 3 with its negative pole stopped against the spring 26 of the laser module 2, and then the outer thread 411 of the socket 41 is threaded into the inner thread 31 of the cylindrical casing 3 and the plug rod 421 of the cap 42 is inserted into the axle hole 412 and connected to the positive pole of the battery set 5 in the taper orifice 412a. Pressing down the the clip-like press rod 422 causes contact of the raised contact 423 with the cylindrical casing 3, in connecting the laser module 2, the cylindrical casing 3, the switch 4, and the battery set 5 into a closed circuit, and therefore the laser diode 23 is triggered to produce a laser beam being transmitted through lens 14.

Figure 4:
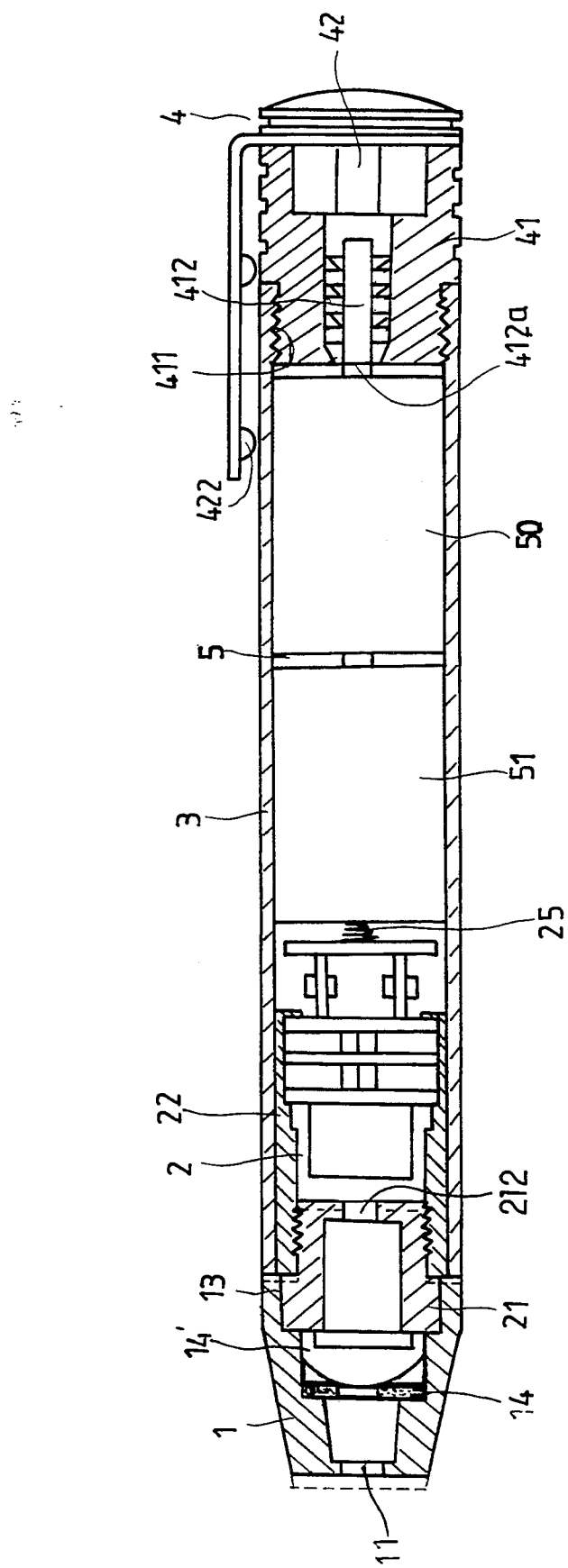
FIG. 4 is similar to FIG. 3 but showing the focus adjusted.

Referring to FIG. 4, any focus error can be conveniently corrected by turning the focus control element 21 on the casing 22 to change the distance between the laser diode 23 and the lens 14.

Figure 5:
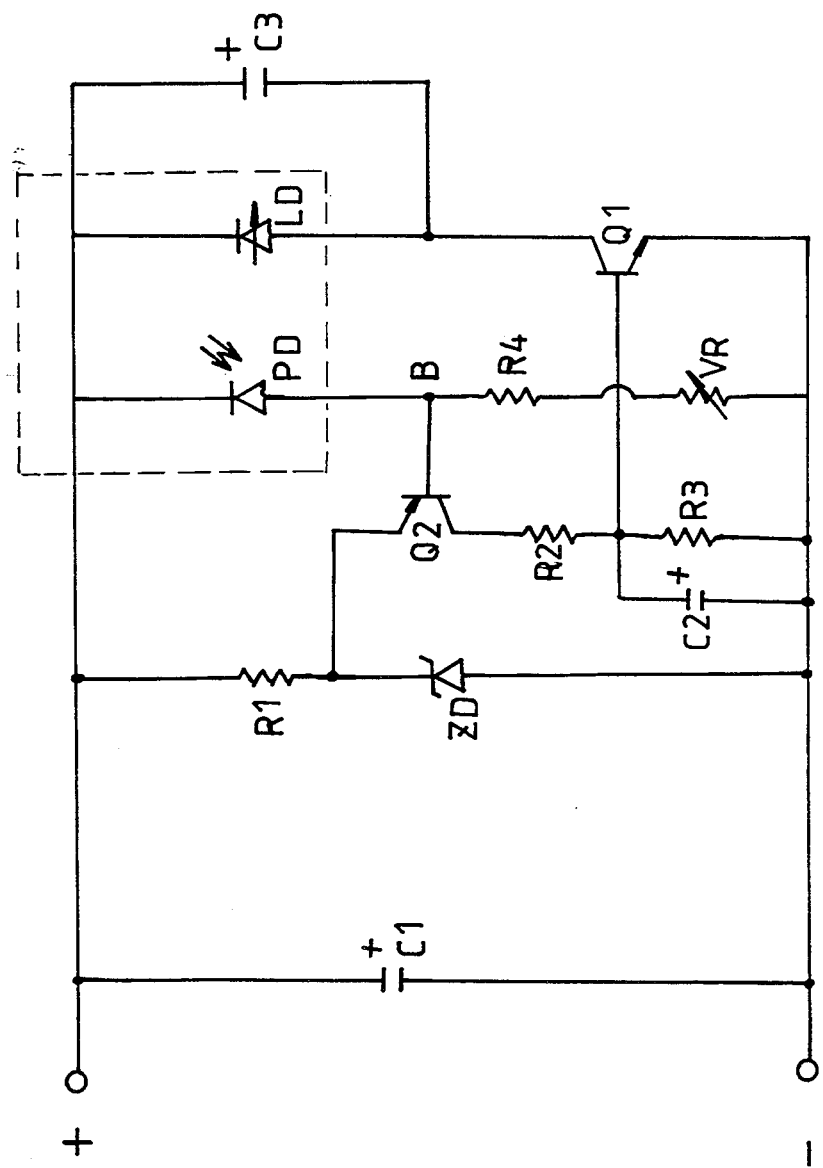
FIG. 5 is a circuit diagram for the laser pointer.
Figure 6:
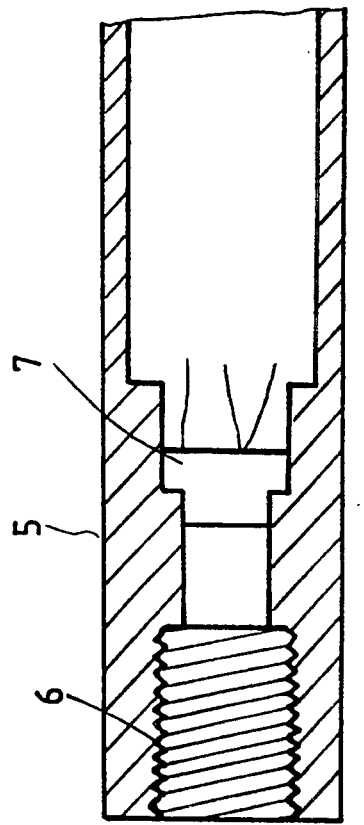
FIG. 6 illustrates a laser module and laser firing lens assembly for a laser pointer according to the prior art.

Referring to FIG. 5, therein illustrated is the circuit diagram of the laser pointer. Basically, the circuit is a constant current control circuit. Transistor Q1 stabilizes electric current to laser diode LD. Laser diode LD emits a laser beam. Photoelectric diode PD receives the laser beam for feedback reference. Electric current to laser diode LD is controlled by transistor Q1, which is controlled by transistor Q2. Transistor Q2 and 2.5 V zener diode ZD provide a reference voltage (2.5 V), and form a constant current source. Photoelectric diode PD is connected to the base B of transistor Q2 for negative feedback so as to stabilize the circuit. There are two possible reasons which cause variation of output power. One reason is that input working voltage is changed. Because zener diode resists against change of working voltage, constant current does not change, and therefore output power is constantly maintained. The other reason is that the change of the working temperature of laser diode LD causes change of output power. Because photoelectric diode PD detects feedback of output power, compensation can be done, and therefore a constant output is achieved.

While only an embodiment of the present invention has been shown and described, it will be understood that various modifications and changes could be made without departing from the spirit and scope of the invention.

I claim:

1. A laser pointer comprising a laser module fitted into a cylindrical casing and attached with a laser firing lens assembly and connected to a battery set and controlled by a switch to fire a laser beam for pointing, wherein said laser firing lens assembly is made in the shape of a hollow, truncated cone having a laser firing hole on a front end thereof, and a lens supported on an O-ring inside a stepped inside wall thereof;

said laser module comprises a cylindrical shell inserted in said cylindrical casing to hold a focus control element, a laser diode, a rubber cushion, a printed circuit board, and a spring, said focus control element comprising a hollow screw rod threaded into an inner thread on said cylindrical shell and a small hole on the hollow screw rod for passing the laser beam, said rubber cushion being disposed between said laser diode and said printed circuit board, said laser diode being electrically connected to said printed circuit board;

said cylindrical casing is made from a conductive material to hold said battery set, having a smooth front end, into which said laser module fits, and a rear end with an inner thread;

said switch comprises an insulative stepped socket and a cap, said insulative stepped socket having an outer thread threaded into the inner thread on the rear end of said cylindrical casing, a stepped axle hole through the longitudinal center terminated to a small taper orifice, said cap being made from a conductive material having a plug rod fitted into the stepped axle hole on said insulative stepped socket and a clip-like press rod for switching control, said clip-like press rod having a raised contact reversibly pressed to contact said cylindrical casing in electrically connecting the said battery set to said laser diode; and said battery set has the positive pole inserted in the taper orifice and electrically connected to said cap, and the negative pole connected to said spring.

2. The laser pointer of claim 1 wherein rotating said focus control element on the cylindrical shell of said laser module in either direction causes change of distance between said lens and said laser diode so that the focus is adjusted.

3. The laser pointer of claim 1 wherein said stepped socket and said cap of said switch are separately made, and said clip-like press rod and said plug rod of said cap are integrally shape formed.

* * * * *